United States Patent [19]
Monen

[11] Patent Number: 5,452,285
[45] Date of Patent: Sep. 19, 1995

[54] UNIFORMLY DISTRIBUTED SERVO DATA FOR OPTICAL INFORMATION STORAGE MEDIUM

[75] Inventor: Marinus J. B. M. Monen, Stow, Mass.

[73] Assignee: Polaroid Corporation, Cambridge, Mass.

[21] Appl. No.: 129,947

[22] Filed: Sep. 30, 1993

[51] Int. Cl.6 .................................. G11B 7/26
[52] U.S. Cl. ........................ 369/275.3; 369/44.26; 360/77.08; 360/77.05
[58] Field of Search ............... 369/275.3, 32, 48, 59, 369/44.26, 50, 52, 275.1, 275.4; 360/75, 77.05, 77.08; 371/71, 38

[56] References Cited

U.S. PATENT DOCUMENTS

| | | | |
|---|---|---|---|
| 4,464,757 | 8/1984 | Monen | 371/71 |
| 4,499,574 | 2/1985 | Braat | 369/109 |
| 4,761,775 | 8/1988 | Murakami | 369/46 |
| 4,817,067 | 3/1989 | Takahashi et al. | 369/44 |
| 4,858,221 | 8/1989 | Roméas | 369/44 |
| 4,914,645 | 4/1990 | Getreuer et al. | 369/124 |
| 4,935,917 | 6/1990 | Yoshimaru | 369/275.3 |
| 4,949,331 | 8/1990 | Maeda et al. | 369/275.3 |
| 4,967,403 | 10/1990 | Ogawa et al. | 369/275.3 |
| 4,980,882 | 12/1990 | Baer et al. | 369/275.3 |
| 5,038,339 | 8/1991 | Pasman et al. | 369/275.3 |
| 5,047,619 | 9/1991 | Zurbrick | 369/275.3 |
| 5,099,467 | 3/1992 | Sumihiro et al. | 369/44.26 |
| 5,117,412 | 5/1992 | Ito et al. | 369/109 |
| 5,119,363 | 6/1992 | Satoh et al. | 369/275.3 |
| 5,142,524 | 8/1992 | Horie | 369/275.1 |
| 5,170,385 | 12/1992 | Senshu | 369/48 |
| 5,206,847 | 4/1993 | Kanda | 369/44.26 |
| 5,305,302 | 4/1994 | Hardwick | 369/275.3 |
| 5,329,509 | 7/1994 | Takahara et al. | 369/44.26 |

Primary Examiner—Georgia Y. Epps
Assistant Examiner—Kim-Kwok Chu
Attorney, Agent, or Firm—John S. Vale; Christopher P. Ricci

[57] ABSTRACT

An optical information storage medium (e.g., disk) has an arrangement of optically detectable marks in a uniform angularly offset, polar array wherein each mark carries timing, tracking and addressing information.

29 Claims, 6 Drawing Sheets

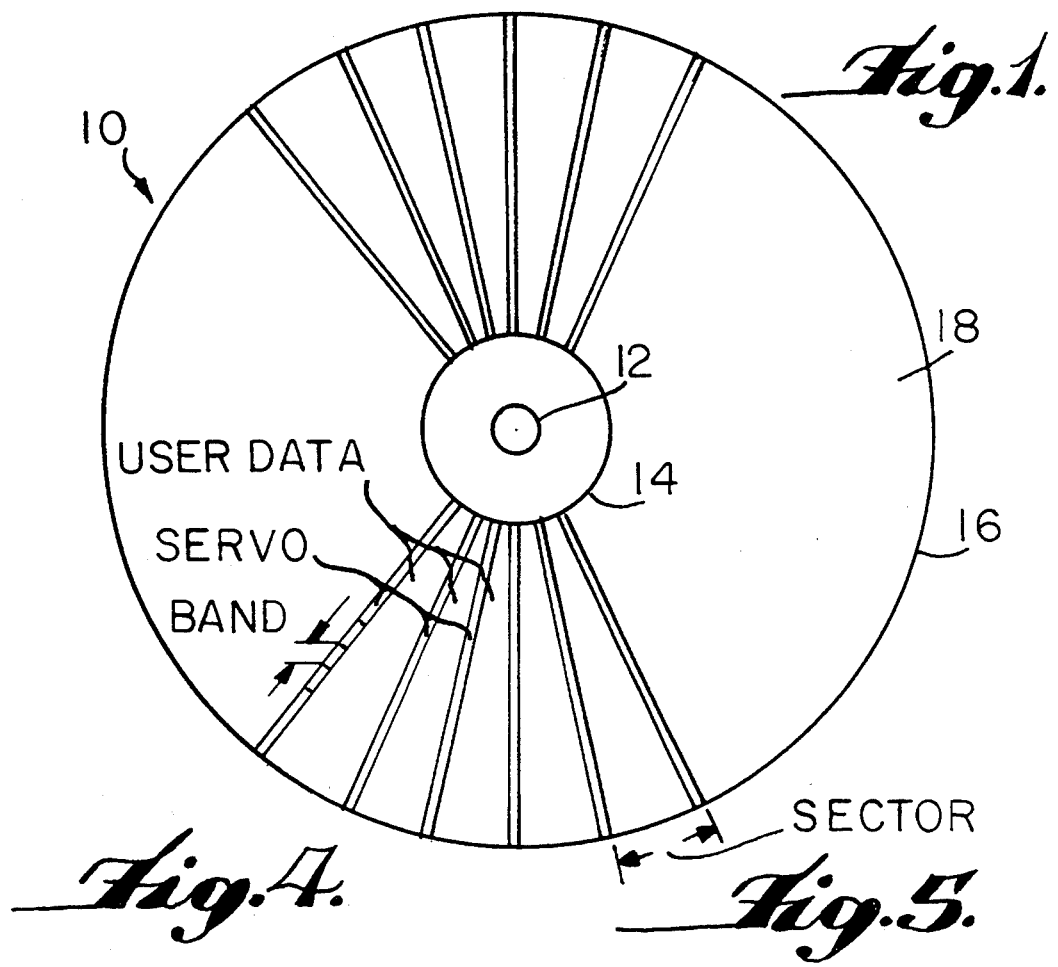
Fig. 1.
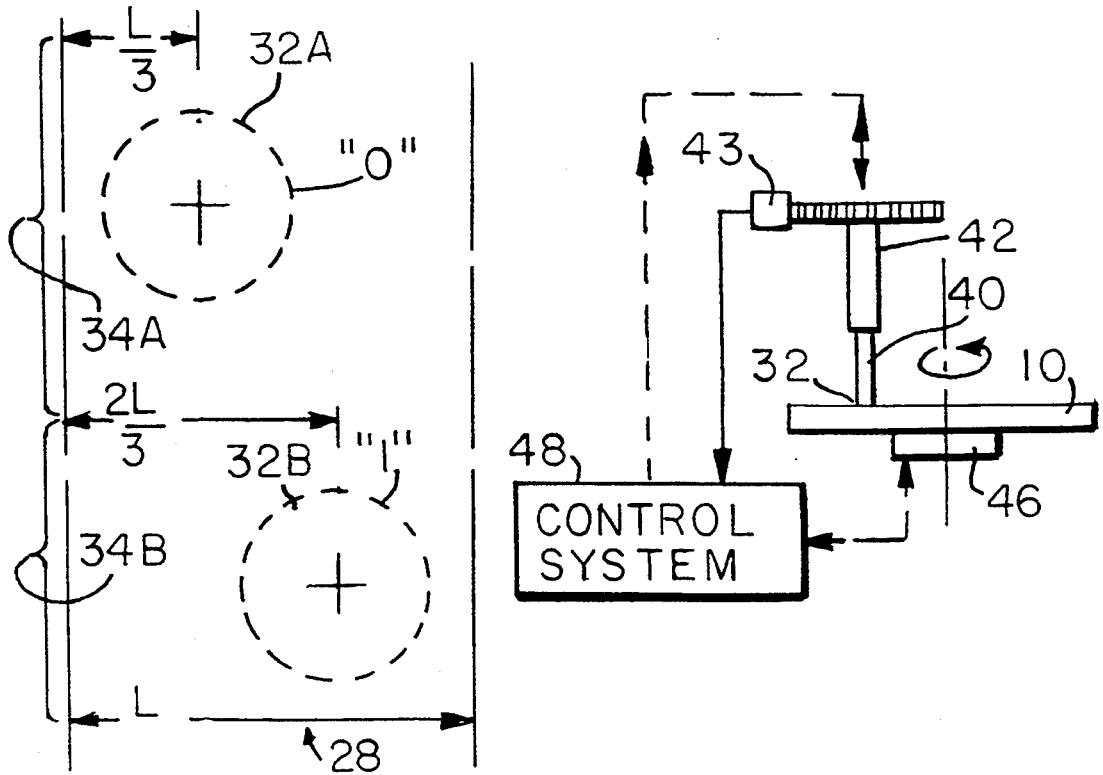
Fig. 4.
Fig. 5.

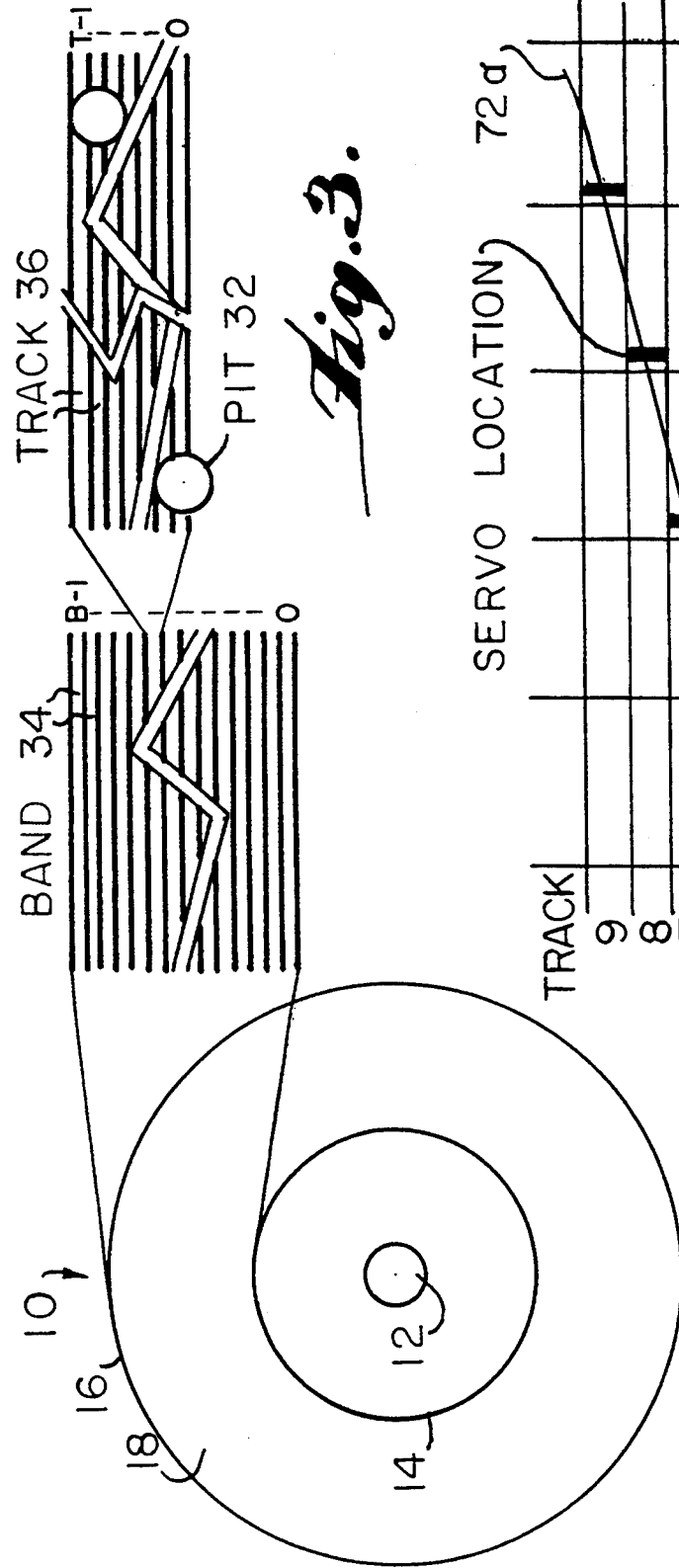
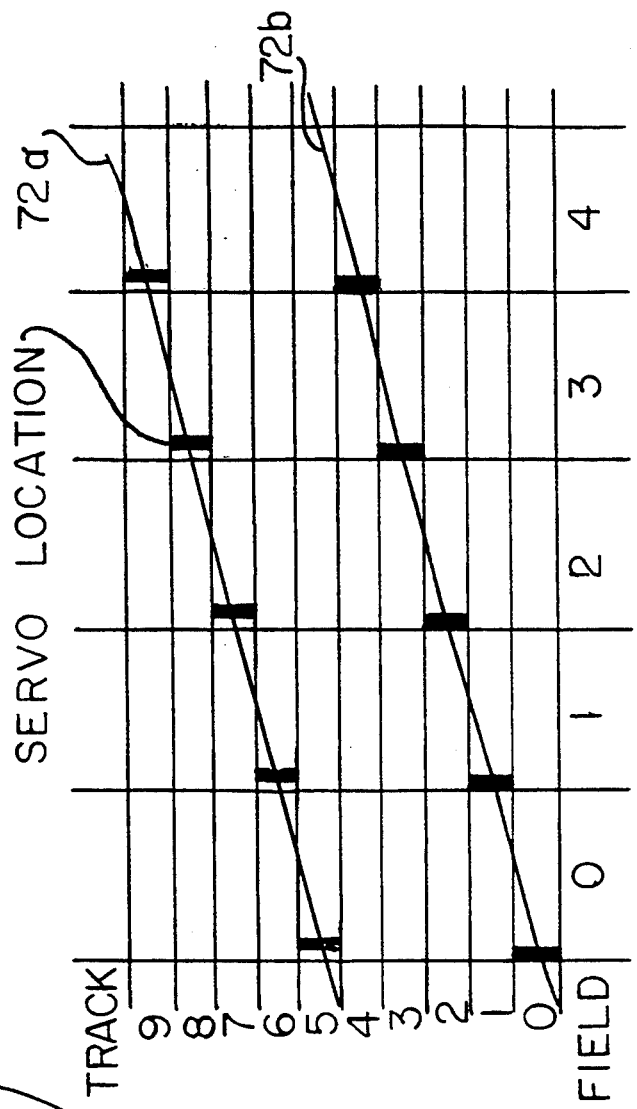

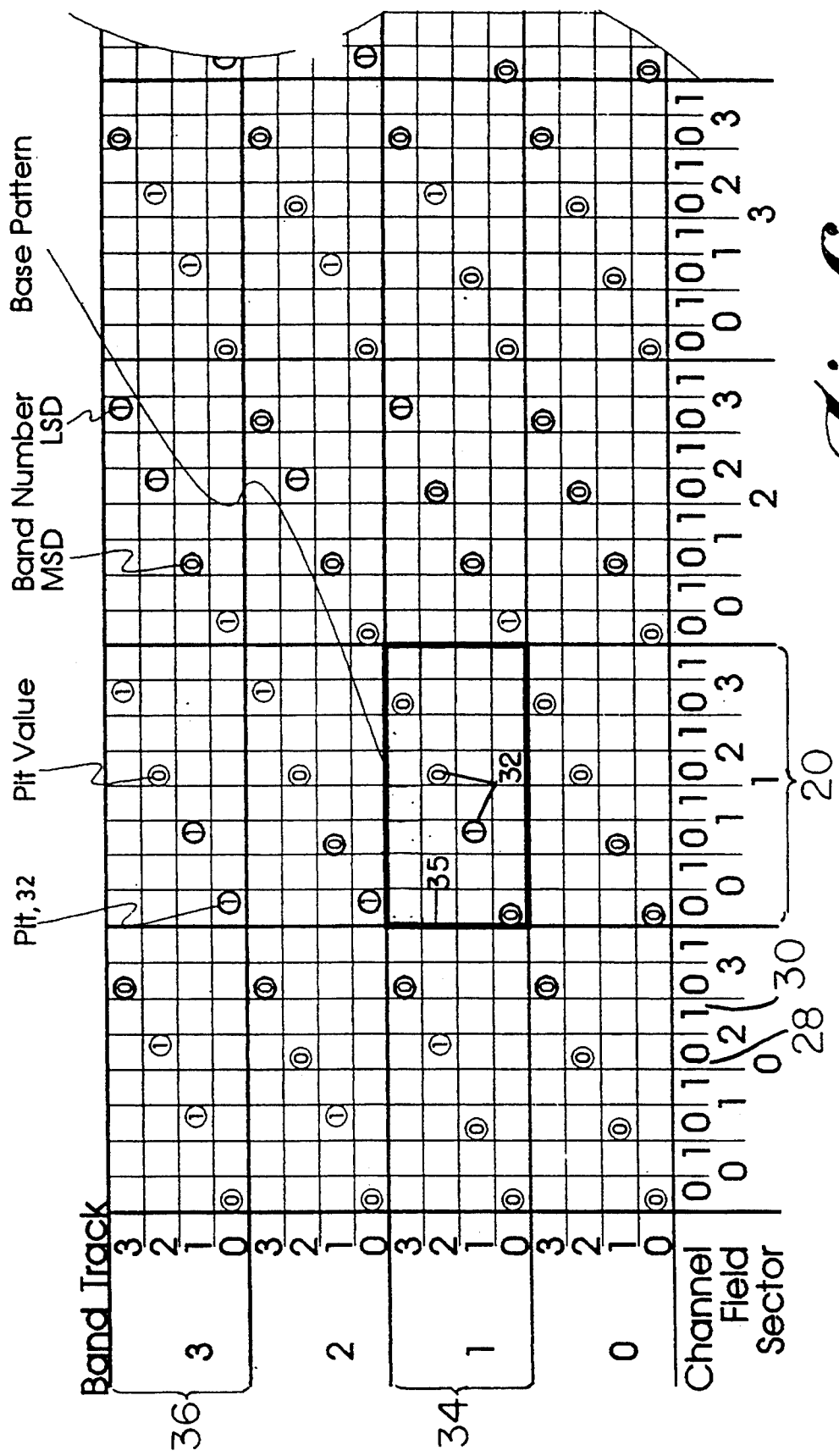

UNIFORMLY DISTRIBUTED SERVO DATA FOR OPTICAL INFORMATION STORAGE MEDIUM

BACKGROUND OF THE INVENTION

The present invention relates to optical media, and in particular, to optical media for data or information storage having a uniformly distributed array of indicia, for example, pits, which are available to provide timing, fine tracking and address information.

Optical media such as optical disks, compact disks and data disks are manufactured to close tolerances. For example, disks which have a center hole placed with high precision reduce radial run out or departure from concentricity. Also disks are produced with little or no substantial radial distortion or elliptical stretching. As the tolerances have been improved the storage capacity of such devices has increased.

Eccentricity and elliptical distortion cause timing and tracking errors. Compensation for residual imperfections is generally achieved by a precise servo control system which employs feedback from optically detectable indicia on the disk. The indicia, which are read by a laser stylus, usually include timing marks or pits for producing clocking signals, so-called wobble pits for tracking control and address pits for accessing information within the track. Typically the pits are arranged in various formats whereby the position of any particular pit has a specialized and singular meaning. These formats differ in accordance with the control system employed, the data rate, the laser spot size, the configuration of the servo feedback loop, data density and various other limiting factors. Unfortunately, differing formats are usually not compatible. Also, achieving a performance advantage in one format may require a tradeoff in another area. For example, it may be possible using a particular array of pits to accurately spot a disk position or address by track and sector. However, such an array may require undue disk space, and while access is accurate, it may be slow.

Compensation of angular and radial run out is traditionally done with feedback control based on media formats designed for feedback control. Feedback alone has its limitations and requires tight media tolerances, which add to the cost of the media. A feed forward, or predictor, system can relax the media tolerance requirements. Thus, the need exists for a media format that is designed for both feedback and feed forward control. Although a hardware system for implementing feed forward and feedback control may be more complex than one implementing feedback alone, such a system is more flexible and more powerful. Current technology allows for cost effective implementation of such complex servo designs.

In summary, there is a need for a simplified pit format for reducing the stringent physical tolerances required for currently available optical media without increasing access time. There is also a need for a pit format which has the capacity to allow for improved resolution as the technology improves.

SUMMARY OF THE INVENTION

The invention is based upon the discovery that a uniformly distributed array of indicia, for example pits, may be employed interchangeably to provide timing, fine tracking and address information in an optical information storage medium.

It is an aspect of the invention that the medium is divided into uniformly distributed servo areas separated by data areas and that only one indicium or pit is assigned to each band in a servo area and that each pit contains timing, addressing and tracking information. The pit pattern may be a regular series, a double or overlapping series or even a random arrangement.

In a particular embodiment, the invention is directed to a universal pattern or format of pits which is relatively insensitive to pit size and disk manufacturing tolerances. In the embodiment, the invention is directed to an optical medium such as an optical disk being formatted with a uniformly distributed array of angularly offset indicia, each indicium being available to provide timing, tracking and address information.

In a preferred form, the optical medium comprises an optical disk having concentric circular or spiral spaced track bands circumferentially divided into sectors. Each sector has servo areas containing angularly offset radially offset pits which interchangeably establish timing, address and tracking functions.

Specifically the disk is divided circumferentially into a plurality of uniform angular divisions. Each disk has S sectors per 360 degrees. Each sector has F fields and each field has C channels. At least one channel per field is assigned to servo functions and the remaining channels are assigned to data storage.

The disk is radially divided into B concentric bands. Each band is further subdivided into T tracks. Each servo channel has one pit in each band. The pits are arranged so that there is a known radial relationship with respect to each other pit whereby fine tracking can be established. Each pit has an angular position within its corresponding servo channel which establishes its value v. That is each servo channel has V angularly offset locations therein to respectively define a value v from a zero (0) value to V−1 for the pit assigned to each such location within a particular channel whereby an address for each band may be established. Within a band, the band number is mapped with a uniform distribution a number of times on the servo channel pit values. The pit values of the same servo channel are associated with the same digit of the band number in all bands. The servo channels resemble relatively narrow spokes of a wheel and the data channels represent relatively wide spaces therebetween. In the conveniently preferred arrangement, the pits contain timing information as a result of angular separation; the pits also contain address information as a result of the angularly offset angular position of each pit within a servo channel; and the pits contain fine tracking information as a result of the radial position of each pit relative to the other pits.

BRIEF DESCRIPTION OF THE DRAWINGS

FIG. 1 is a plan view of an optical disk showing generally the layout of angular sectors and radial bands formatted in accordance with the present invention;

FIG. 3 is an illustration of the basic radial divisions of the optical disk shown in FIG. 1;

FIG. 4 is an enlarged illustration showing the basic pattern for differentiating pit values;

FIG. 5 is a simplified illustration of a servo control system,

FIG. 6 is a schematic illustration of the basic layout and its information contents;

FIGS. 8-10 are illustrations of exemplary alternative pit patterns in accordance with the invention.

DESCRIPTION OF THE INVENTION

Figure 2:
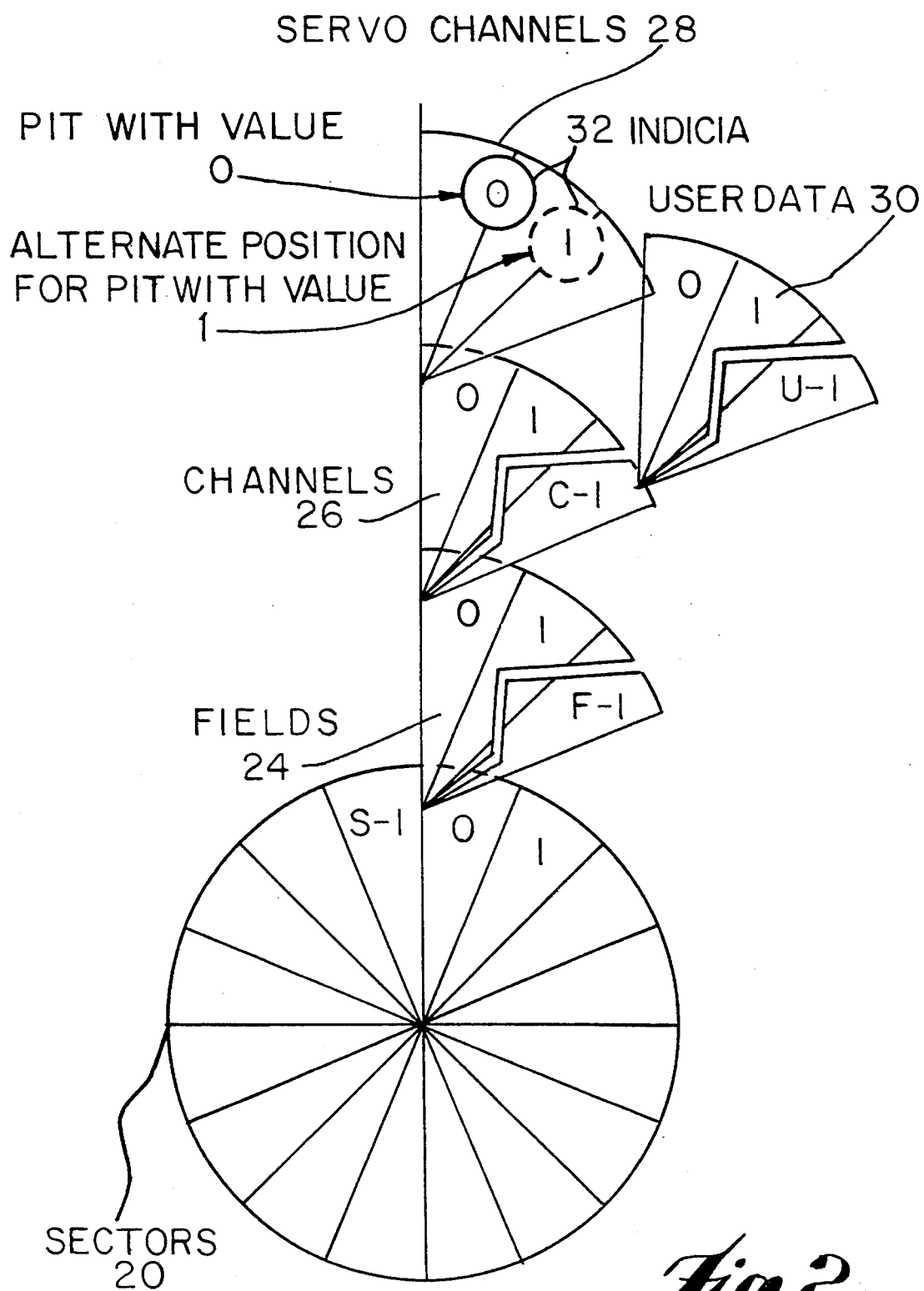
FIG. 2 is an exploded view illustrating the basic angular divisions of the optical disk shown in FIG. 1, having sectors, fields and channels.

The invention is directed to a method apparatus and systems for universally formatting various optical media by means of optically detectable indicia, for example pits, which may be selectively employed to perform timing, addressing and fine tracking using the same indicia or pits interchangeably. The conventional schemes for formatting optical media, as noted above, employ selected patterns of optical marks or pits to separately determine timing, addressing and radial run out compensation functions. Further, in prior art arrangements the pits are spatially segregated by function, usually either in preselected sectors or bands on the disk. Addresses are usually encoded in the same recording code and density as the user data. Prior art systems are thus limited in their versatility. While these systems may be effective to allow for timing, addressing and fine tracking, these arrangements are not designed to allow for any significant improvements in the way disks are manufactured. Nor do conventional formatting techniques allow for increased data recording density enabled by the constantly improving accuracy of laser scanning and servo technology.

The present invention provides a formatting arrangement which is versatile as to pit functions; insensitive to disk manufacturing tolerances; and operative over a wide range of track sizes and linear data densities regardless of formatting pit size.

In the present invention, generally illustrated in FIG. 1, an optical information storage medium in the form of optical disk 10 has a central aperture 12, a central label area 14, an outer edge 16 and an information carrying portion 18 between the label 14 and the outer edge 16. The information area 18 is systematically divided into angular and radial divisions as follows.

FIG. 2 shows the angular divisions. The major angular divisions are sectors 20. According to the invention there are an integral number S of equal sectors 20 per 360° (numbered s=0, 1, 2, ... S−1). Each sector 20 is subdivided into F equal fields 24 (numbered f=0, 1, 2, ... F−1) and each field is further subdivided into C equal channels 26 (numbered c=0, 1, 2, ... C−1). The channels 26 are classified as servo channels 28 and user data channels 30. At least one channel in each field is a servo channel. With no loss of generality, the first servo channel in each field is referred to as channel 0 in the following descriptions. Indicia 32, for example pits, establish individual servo data stored on the disk 10 in the respective servo channels. Each servo channel has a unique address consisting of sector number, field number and channel number. In the exemplary embodiment shown herein, a sector could be defined as including more than one servo channel.

The disk 10 is also radially divided (FIG. 3) into B equal concentric bands 34 (numbered b=0, 1, 2. . . B−1). In the examples the band numbers increase towards the outer edge 16 of the disk 10. Each band 34 is further subdivided into T equally spaced tracks 36 (numbered t=0, 1, 2. . . T−1). The track numbers also increase towards the outer edge 16 of the disk 10. Each track has a unique address consisting of band number and track number.

The optically detectable indicia or pits 32 are laid out on the disk 10 at selected locations thereon. The pits 32 are arranged in a pattern which is uniformly distributed, angularly offset and radially offset. The pits 32 are conveniently arranged in a polar coordinate grid. In formatting arrangements according to the prior art, pits are clustered angularly in "header sectors" and "servo bytes" and radially on or adjacent the user data tracks. According to the current invention, the pits are typically uniformly spaced angularly every C channels. Within a servo channel, the pits are separated by exactly one band width radially, so the pits are distributed uniformly in this axis as well. The distribution is digital in that there are certain discrete locations that may contain a pit. Whether a particular location is populated is determined by a series of equations or rules. One rule encodes the band number in the angularly offset position of the pit within a servo channel 28. Another rule determines the radially offset track position of any one pit relative to its neighboring pits.

A uniformly distributed array of indicia encompasses an arrangement in which one or more indicia may be eliminated from a sector or channel. Such an arrangement is useful for convenience of synchronization. For example, in the exemplary embodiment detailed herein, the last pit in sector S−1 may be deleted.

It should be further understood that, although the indicia are described as pits, in the exemplary embodiments, sensible indicia of various forms may be employed. For example, the indicia may be manifested as a phase change, a polarization or magnetic effect, a change in transmission or a change in reflectivity of the medium. The detectable indicia may be made by various methods including, but not limited to, a physical dislocation of the surface of the medium to form a pit, or by printing or etching, or molding, as well as by other techniques known to those skilled in the art.

Each pit has a digital value which is determined by the position of the pit 32 in the servo channel 28. In particular, referring to FIG. 4, servo channel 28 has pits 32A and 32B in separate bands 34A and 34B. If each servo channel 28, has a finite arc length L, then if a pit is located more towards the beginning of the servo channel 28 it can be arbitrarily called a zero, and if it is located more towards the end of the servo channel 28 it can be arbitrarily called a one, or vice versa. In the exemplary illustration of FIG. 4, pit 32A is located at L/3 as measured from the beginning of the channel and is thus a "zero" pit. Pit 32B is located at 2L/3 measured from the same position and is thus a "one" pit. In accordance with the invention, V values v may be assigned to a pit (where v=0, 1, 2. . . V−1) by dividing the arc of a servo channel into V+1 equal partitions. The partition boundary on which the pit is centered is associated with the value of the pit. Thus, each pit may be assigned a digital value whereby addresses may be established.

A general control scheme is illustrated schematically in FIG. 5. A scanning beam 40 from a scanning laser 42 carried by a radically displacable laser drive 43 is adapted to sense each pit 32 of disk 10. Servo motor or disk drive 46 rotates the disk at a controlled speed. A control system 48 is effective to manage operation of the laser drive 43 and disk drive 46. The position of the pit 32 is sensed in order to provide input signals for the control system 48 for laser drive 43 and disk drive 46, to position the laser 42 in response to the sensed pits and to rotatably drive the disk at a precise speed.

An offset layout of pits 32 according to the invention is shown in FIG. 6. (The numbers chosen for this particular example do not yield a practical disk, but they serve to illustrate the invention in a simple and easily understood way. Several practical examples will be presented later.) The layout has a base pattern 35 (shown blocked in heavy lines for clarity). The base pattern 35 is an area comprising one band 34 by one sector 20, which is repeated B*S times with B equal to the number of bands and S equal to the number of sectors on the disk. The number of pits 32 in base pattern 35 is equal to the number of tracks 36 into which a band is divided and is also equal to the total number of servo channels 28 per sector 20. The pits 32, shown as a circle with an enclosed number, are each radially centered on a corresponding track 36 in such a way that there is one and only one pit per track in a base pattern. Each pit is located in a servo channel 28. In a base pattern there is one and only one pit per servo channel. For simplicity, the base pattern 35 shown in the exemplary embodiment of FIG. 6 consists of four tracks 36 (numbered 0, 1, 2, 3) by four fields 24 (numbered 0, 1, 2, 3), each field having one servo channel 28 and one user data channel 30. It can be seen that pits in the same servo channels are centered on the same tracks in the corresponding bands. The offset of the pits in the radial direction is useful for fine tracking. Their angular position within the servo channels encodes the band address as described hereinafter.

Figure 7:
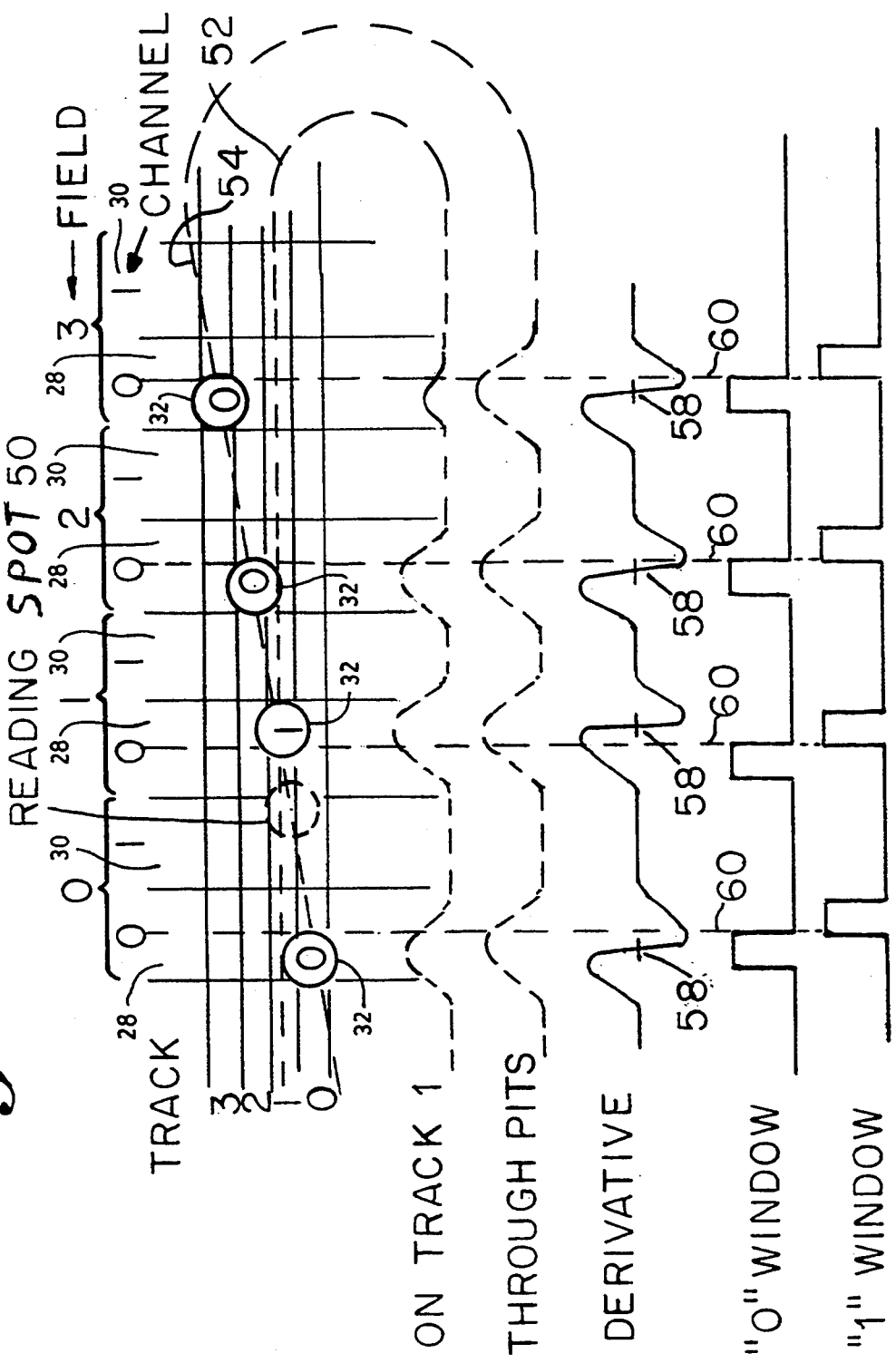
FIG. 7 is an illustration of pits and corresponding signals employed in support of the basic servo functions.

FIG. 7 illustrates in greater detail the base pattern 35 from FIG. 6 with accompanying signal diagrams. In the base pattern 35, the first pit 32, in field 0, is centered radially on track 0. The next servo pit, in field 1, is centered on track 1. The remaining pits are centered in a track having the same number as the field. Thus, the exemplary pits layout of FIG. 7 is arranged in a series of pits located in a servo channel 28 followed by one data channel 30. Each servo pit is offset from the next pit in its series by one track.

A close examination of FIG. 6 shows that, while the base pattern repeats in every band and in every sector, there are subtle differences among the repeated copies. In FIG. 6, each pit 32 has a "one" (1) or "zero" (0) value as indicated by the encircled number and is positioned later or earlier in the servo channel in accord with that value. This sequence of "ones" and "zeros" varies from copy to copy of the base pattern. The sequence of "ones" and "zeros" actually encodes the number of the particular band in which the base pattern copy is located. The angular position of the pit in a servo channel 28 depends upon the value of the band number digit that is associated with that pit. The pit in channel zero of sector zero of FIG. 6 corresponds with the most significant digit (MSD) of the band number and successive digits appear in order of decreasing significance to the least significant digit (LSD). (Any other fixed order of digits, for example increasing significance or even random order, is within the scope of the invention.) The band number digits then repeat in the same sequence. In the example of FIG. 6 the band number is mapped on three pits and the address of band 1 is 0,0,1. The variation in the fine structure of the base pattern copies arises because the number of digits in the band number is not equal to the number of servo channels in a sector, so the band number digits precess through the sectors of the band. In the particular copy of the base pattern 35 shown in FIG. 7 (band 1, sector 1 of FIG. 6), the first pit 32 in field 0 is centered angularly at L/3 (i.e., the pit is a zero). Because of the precession of band address digits through the sectors, this pit represents the second digit of the band address.

More particularly, the base pattern 35, selected from band 1 sector 1 of FIG. 6, has four tracks 0,1,2,3 and four fields 0,1,2,3. Each field has a servo channel labeled 0 and a data channel labeled 1. The servo channel 0 is divided by a center line 60. The scanning beam 40 (FIG. 5) produces a reading spot 50 which may move relative to the base pattern 35 along a variety of paths depending upon the output signal from the laser drive 43. When, for example, the reading spot 50 is following a particular track, the control is adapted to cause the spot 50 to move more or less midway along a particular track. For example, in FIG. 7, the spot 50 may follow path 52 along track 1 of the band. When the spot 50 is navigating about the disk it may follow path 54, for example, which crosses a number of tracks.

The reading spot 50 produces On Track 1 signal when the spot moves along the dotted line 52. The Through Pits signal is produced when the spot 50 moves across the disk along a path exemplified by dotted line 54 as shown. For convenience, dotted line 54 passes near the center of each of the four pits in the base pattern and the resulting signals appear equal. The Derivative signal is a periodic signal which has a zero crossover 58 for each pit, near the center line 60 of each servo channel. In FIG. 7, the Derivative signal is drawn to correspond to the Through Pits signal and so the amplitude of each cycle is the same. It should be understood, however, that a series of unequal pulses will produce the same zero crossovers 58. Any path through the base pattern produces a series of four pulses and four zero crossovers, as shown, one for each pit in the four fields of the base pattern 35. These four pulses and four zero crossovers may be used to determine timing, addressing, and fine tracking, as will be shown subsequently.

Timing is conveniently established by counting down from a high frequency system clock signal to provide the two Window signals shown in FIG. 7. The "0" Window is one third of a channel long and ends at the midpoint 60 of the servo channel 28. The "1" Window is one third of a channel long and starts at the midpoint 60 of the servo channel 28. According to the invention, the zero crossover 58 should occur midway of the respective window signals. Any difference may be compensated for by a feed forward or feedback correction applied to the control 48 and the servo drive 46 in FIG. 5 or to the frequency of the system clock. Since the servo channels align from band to band, these operations can proceed even if tracking has not been established.

It should be understood that the circumferential or angular spacing of any two pits may be employed as timing information. There is no need to provide special timing or clock pits as in the prior art. There is a known relation between the midpoint 60 of the servo channel and the zero crossing 58. Thus, by simply observing the time between the occurrence of any two zero crossings 58, timing may be accurately established. In accordance with the invention, any and all of the pits may function as clock pits.

The "0" and "1" Window clocking signals also provide the means for decoding the address of the current band. When zero crossover 58 occurs midway of the 0 Window signal, this pit is a zero (0) pit; likewise when the zero crossover 58 occurs midway of the 1 Window signal, the pit is a one (1) pit. Since the band address digits of equivalent significance align radially from band to band, at least coarse addresses can be read even if tracking has not been established. As one moves from band to band, digits of lesser significance change, but the more significant digits will not change. Reading the more significant digits gives a coarse indication of radial position from which a feed forward or feedback correction for radial run out may be derived for application to the control 48 and the laser drive 43. As this correction is applied, radial run out is reduced, more address digits become readable, and the correction may be refined.

The same features of the format as outlined above are also useful to implement random access. When the reading spot 50 moves fast with respect to the tracks, the most significant part of the band number can be retrieved reliably. When the speed of the spot 50 is reduced sufficiently the full band number can be retrieved reliably. When the spot 50 moves slowly with respect to the tracks, track crossings can be counted based on the track to track offset of the pits.

Once the radial run out has been reduced to one band, the amplitude of the peaks replaces the Derivative signal as the source of run out data. The relative amplitude of the servo pit signals from each field can be used to determine track position within the band. The largest of the four peaks indicates the local track in the wandering of the reading spot 50, providing a radial run out signal just as the band address did above. Finer tracking can be accomplished comparing the amplitudes of multiple peaks. In a digital approach, one determines whether the track 1 signal is greater than the track 0 signal, the track 2 signal is greater than the track 1 signal, etc. to determine the actual radial location. In an analog approach, the On Track 1 signal may be used to determine radial run out in a manner analogous to conventional "wobble pit" based systems. Specifically, the pits in fields 0 and 2 which are on opposite sides of the line 52 produce an equal output when the spot 50 follows line 52 centrally of track 1. Any difference between the On Track 1 output at fields 0 and 2 produces an error signal which may be employed to correct for run out. Thus, the pits pattern has radial run out compensation capability.

Once fine tracking has been established, a refinement in clocking is possible. In the On Track 1 Signal, the pit at field 1 produces a relatively large output. This larger amplitude produces a more reliable zero crossover than, for example, the pit at field 3 and may be used as a clocking signal, again in exact analogy to conventional "clock pit" based systems.

The servo format allows for a variety of recording codes, radial recording densities and linear recording densities as long as the data recorded in the user data channels does not interfere with the information from the servo channels. Whether interference will occur depends on the properties of both the device and the media. A recording code and linear density that runs synchronously with the servo channel clock is preferred. The radial recording density is preferred to be an integral multiple of the track width. The examples which follow show alternative embodiments of suitable format layouts in accordance with the invention in tabular (Table II) and graphic (FIGS. 8–10) forms. Table I below defines the terms used in the examples. For example, the total number of bands is identified by the letter B and band numbers are identified by b and are numbered 0, 1, 2 . . . B−1, etc.

TABLE I

FORMAT DESCRIPTION

| PARAMETER | SYMBOL | VALUE |
|---|---|---|
| Bands per disk: | B | |
| Band number: | b | 0 . . . (B-1) |
| Tracks per band: | T | |
| Track number: | t | 0 . . . (T-1) |
| Sectors per revolution: | S | |
| Sector number: | s | 0 . . . (S-1) |
| Fields per sector: | F | |
| Field number: | f | 0 . . . (F-1) |
| Channels per field: | C | |
| Channel number: | c | 0 . . . (C-1) |
| Servo channels: | SC | |
| Servo channel number: | sc | 0 . . . (SC-1) |
| Servo values: | V | |
| Value of Servo location: | v | 0 . . . (V-1) |
| Digits per band number (base V): | D | |
| Digit number: | d | 0 . . . (D-1) |
| Value of digit of band number: | b[d] | 0 . . . (V-1) |
| Channel identification: | (s, f, c) | |
| Location identification: | (b, t, s, f, c) | |
| Servo location: | (b, t, s, f, sc) | |
| Radial coordinate of pit center: | r | |
| Angular coordinate of pit center: | a | |
| Arc length of channel: | L | |
| Width of track: | W | |
| Radius of inner most track: | R | |
| Integer multiplication: | * | |
| Integer division: | div | |
| Modulo: | mod | |
| Not equal to: | <> | |

Since the forgoing teaches that the base pattern repeats in each sector and band throughout the disk, only the base pattern is illustrated in the examples that follow. Furthermore, only a solid black rectangle appears in the figures at each servo location (track, field, and channel that contains a servo pit), since the notes below and the specifications in Table II explicitly populate those locations.

Figure 8:
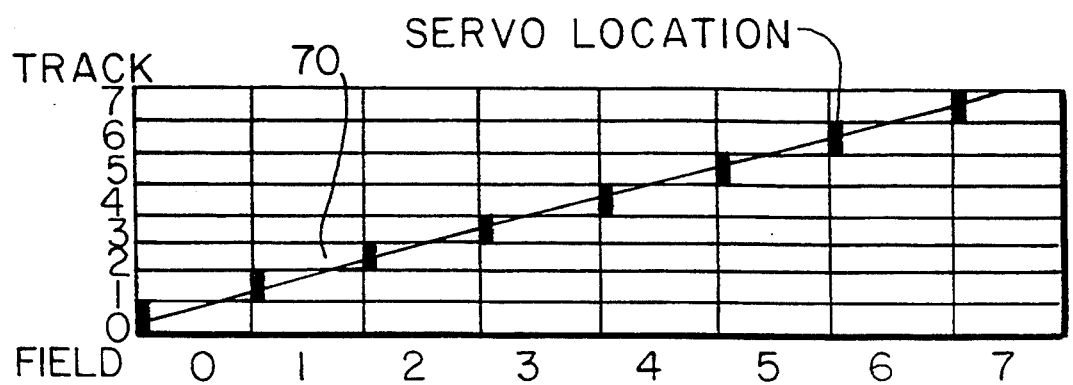

FIG. 8 illustrates a first exemplary format wherein each track in the base pattern has one offset servo location in a single diagonal line 70 and in the same channel (channel 0) in each field. Each track number t has a servo location in a corresponding field number f. The servo locations wrap around at the end of each sector to repeat the base pattern, as taught above.

In FIG. 9, the servo locations are equally divided between two offset lines 72a and 72b. Each track in the base pattern has one servo location. The location in one line, e.g., 72a is offset radially by one track each field but remains in the same channel. Each location of the other line 72b is offset radially by one track each field also and occupies a different channel within a field. This arrangement is particularly suited to conventional "wobble pit" serving. The radial spacing of adjacent pits is the optimal half the width of the band. The close angular spacing of these pits minimizes the influence of any local variation in disk properties on the mismatch in amplitude of the signals from these "wobble pits".

Figure 10:
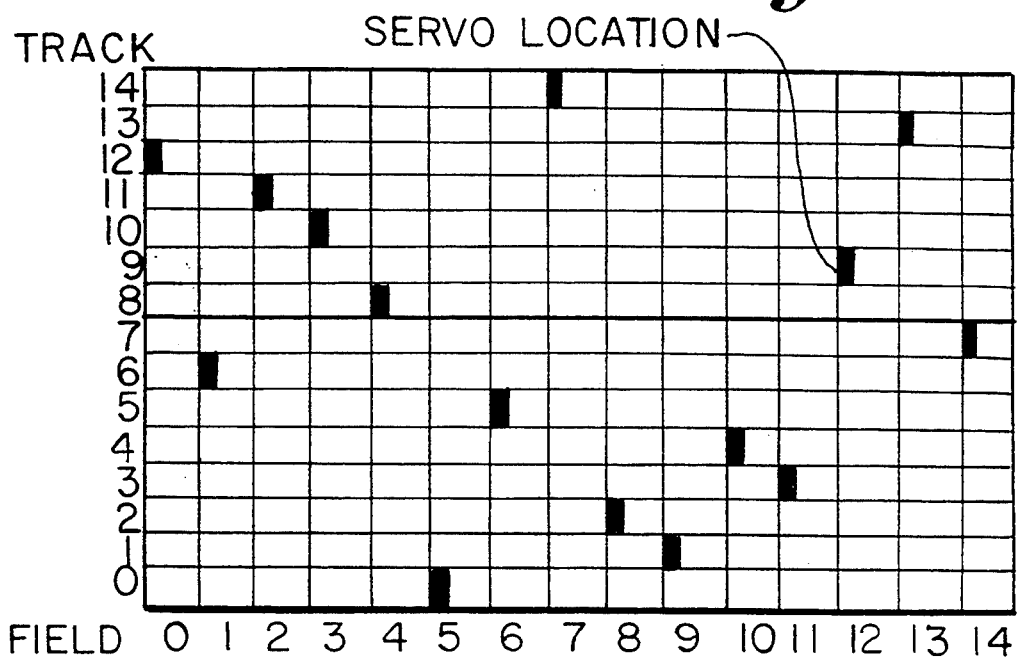

While the uniform or stepwise arrangements of pits shown in FIGS. 6–9 are simple examples of preferred embodiments, any arrangement may be useful, including a random distribution of pits. Whatever array is used, it is only necessary to store in the control system the correlation between the track position of each pit and its angular position. FIG. 10 shows a random arrangement of servo locations one for each track, but in the same channel of each field.

Table II below sets forth a specification for each exemplary format. The notes following the table establish definitions based on the respective specifications.

TABLE II

| Parameter | Example Format 1 (FIG. 8) | Example Format 2 (FIG. 9) | Example Format 3 (FIG. 10) |
|---|---|---|---|
| B | 11,000 | 30,000 | 4,000 |
| D | 15 | 17 | 7 |
| T | 8 | 10 | 15 |
| S | 90 | 408 | 504 |
| F | 8 | 5 | 15 |
| C | 20 | 15 | 5 |
| V | 2 | 2 | 4 |
| SC | 1 | 2 | 1 |

Format 1: (If ((t = f) and (s <> 89) and (f <> 7) and (c = 0)) then and only then location (b, t, s, f, c) contains a pit center.
The coordinates of the pit center are $r = R + W*(b*8+t)$ and $a = (s*160+f*20)*L + (b[s*8+f] \mod 15]+1)*L/3$.
Format 2: If ((t mod 5 = f) and (s <> 407) and (f <> 4) and (c = t div 5)) then and only then location (b, t, s, f, c) contains a pit center.
The coordinates of the pit center are $r = R + W*(b*10+t)$ and $a = (s*75+f*15+t \; div \; 5)*L + (b[(s*10+f*2+t \; div \; 5) \mod 17]+1)*L/3$.
Format 3: If ((t, f) is an element of set A) and (s <> 503) and (f <> 14) and (c = 0)) then and only then location (b, t, s, f, c) contains a pit center.
The coordinates of the pit center are $r = R + W*(b*15+t)$ and $a = (s*75+f*5)*L + (b[s*15+f) \mod 7] +1)*L/5$.
The elements of set A are: (0, 5), (1, 9), (2, 8), (3, 11), (4, 10), (5, 6), (6, 1), (7, 14), (8, 4), (9, 12), (10, 3), (11, 2), (12, 0), (13, 13), (14, 7).

In a preferred embodiment, the last servo channel has no pits. Thus, the pit that is detected after the largest time interval between pits by the device of FIG. 5 (whether the device clock is phase locked with the pits or not), is from servo channel (0,0,0) due to the fact that there is no pit in servo channel (S−1,F−1,SC−1). This feature allows for easy acquisition of servo channel synchronization and rough timing.

Also, in a preferred embodiment, the most significant digit of the band address is zero and maps into servo channel (0,0,0). Thus the value v of the first pit in the first servo channel is zero, allowing finer synchronization.

Furthermore, if the band number repeats an integral number of times (except for the missing digit in the very last servo channel), the pits of those servo channels on which the most significant digit of the band number is mapped are equally distanced, because all the pits of these servo channels are centered on the arc location that corresponds with the zero value of the servo location, facilitating the acquisition of phase lock between the servo channel pits and the clock of the device of FIG. 5.

As taught above, the band number is recorded continuously around the disk in a repeating sequence of digits in a defined order. The band number is recorded (S*F*SC)div(D) times in the servo channels of a band, which is 48 times for format 1, 240 times for format 2 and 1080 times for format 3. A complete band number is recorded in every D consecutive servo channels of a band.

Furthermore, to allow for reliable retrieval of the band number at all times with the tracking servo locked, each track contains every digit of the band number (S*F*SC) div(D)div(T) times with pits that are centered on that track, which is 6 times for format 1, 24 times for format 2 and 72 times for format 3. Thus, there is built-in redundancy and no necessity to employ complex complementary addressing schemes. This feature of the format is true as long as D and F,SC have no prime factor in common. The Tables III-1, III-2, III-3 below show, for each respective format example 1,2,3, the mapping of the fifth copy of a selected band number (e.g., band 2814) on the servo pits.

TABLE III-1

| Band Number | Copy | Digit Significance | Value | Track | Channel | Position |
|---|---|---|---|---|---|---|
| 2814 | 5 | most 14 | 0 | 4 | (7, 4, 0) | L/3 |
| | | most 13 | 0 | 5 | (7, 5, 0) | L/3 |
| | | most 12 | 0 | 6 | (7, 6, 0) | L/3 |
| | | most 11 | 1 | 7 | (7, 7, 0) | 2L/3 |
| | | most 10 | 0 | 0 | (8, 0, 0) | L/3 |
| | | most 9 | 1 | 1 | (8, 1, 0) | 2L/3 |
| | | most 8 | 0 | 2 | (8, 2, 0) | L/3 |
| | | most 7 | 1 | 3 | (8, 3, 0) | 2L/3 |
| | | most 6 | 1 | 4 | (8, 4, 0) | 2L/3 |
| | | most 5 | 1 | 5 | (8, 5, 0) | 2L/3 |
| | | most 4 | 1 | 6 | (8, 6, 0) | 2L/3 |
| | | most 3 | 1 | 7 | (8, 7, 0) | 2L/3 |
| | | most 2 | 1 | 0 | (9, 0, 0) | 2L/3 |
| | | most 1 | 1 | 1 | (9, 1, 0) | 2L/3 |
| | | least 0 | 0 | 2 | (9, 2, 0) | L/3 |

Format 1 (header for III-1 above)

TABLE III-2

| Band Number | Copy | Digit Significance | Value | Track | Channel | Position |
|---|---|---|---|---|---|---|
| 2814 | 5 | most 16 | 0 | 8 | (6, 3, 1) | L/3 |
| | | most 15 | 0 | 4 | (6, 4, 0) | L/3 |
| | | most 14 | 0 | 9 | (6, 4, 1) | L/3 |
| | | most 13 | 0 | 0 | (7, 0, 0) | L/3 |
| | | most 12 | 0 | 5 | (7, 0, 1) | L/3 |
| | | most 11 | 1 | 1 | (7, 1, 0) | 2L/3 |
| | | most 10 | 0 | 6 | (7, 1, 1) | L/3 |
| | | most 9 | 1 | 2 | (7, 2, 0) | 2L/3 |
| | | most 8 | 0 | 7 | (7, 2, 1) | L/3 |
| | | most 7 | 1 | 3 | (7, 3, 0) | 2L/3 |
| | | most 6 | 1 | 8 | (7, 3, 1) | 2L/3 |
| | | most 5 | 1 | 4 | (7, 4, 0) | 2L/3 |
| | | most 4 | 1 | 9 | (7, 4, 1) | 2L/3 |
| | | most 3 | 1 | 0 | (8, 0, 0) | 2L/3 |
| | | most 2 | 1 | 5 | (8, 0, 1) | 2L/3 |
| | | most 1 | 1 | 1 | (8, 1, 0) | 2L/3 |
| | | least 0 | 0 | 6 | (8, 1, 1) | L/3 |

Format 2 (header for III-2 above)

TABLE III-3

| Band Number | Copy | Digit Significance | Value | Track | Channel | Position |
|---|---|---|---|---|---|---|
| 2814 | 5 | most 6 | 0 | 8 | (2, 4, 0) | L/5 |
| | | most 5 | 2 | 0 | (2, 5, 0) | 3L/5 |
| | | most 4 | 2 | 5 | (2, 6, 0) | 3L/5 |
| | | most 3 | 3 | 14 | (2, 7, 0) | 4L/5 |
| | | most 2 | 3 | 2 | (2, 8, 0) | 4L/5 |
| | | most 1 | 3 | 1 | (2, 9, 0) | 4L/5 |
| | | least 0 | 2 | 4 | (2, 10, 0) | 3L/5 |

Format 3 (header for III-3 above)

The following exemplary embodiment sets forth useful numerical relationships of the pit format, disk size and properties and features of the servo control device with respect to the relevant aspects of the invention. The format specifications are identical to the format 1 specifications. In addition, the specifications of the following table also apply.

TABLE IV

| Parameter | Symbol | Value | Unit |
| --- | --- | --- | --- |
| Radius of inner most track | R | 5.50 | mm |
| Outer radius of disk | OR | 25.00 | mm |
| Size of pit (FWHM) | SP | 0.8 | um |
| Width of track | W | 0.2 | um |
| Arc length of channel | L | 436 | urad |
| Length of channel at R | LR | 2.4 | um |
| Size of scanning spot (FWHM) | SS | 0.8 | um |

(FWHM) - Full Width Half Maximum

For optimal servo performance it is preferred that the size of the pits and the size of the scanning spot are equal. For the same reason it is preferred that the width of a band B equals twice the size of a pit.

The length of a channel at the radius R of the inner most track is three times the pit size to ensure, (whether the value of the servo location is "zero" or "one"), that no interference from the servo channel into the data channel occurs.

The overhead of the servo format is 5 percent, i.e., 19 channels are used for data, one channel is used for servo.

The invention is more versatile than prior art schemes because there has been developed a unique yet simple pattern of pits to navigate to any location on the disk. The pattern is uniform and universal. This has been achieved because every pit provides unique information as to timing for speed control; and radial position for disk run out; and addressing for tracking and navigation. Timing is achieved by positioning each pit circumferentially within a known servo channel. Fine radial positioning is achieved by offsetting the pits radially. Addressing is achieved by angularly positioning each pit within the servo channel.

The important feature to appreciate is that the formatting arrangement of the invention contains timing, tracking and addressing using the same pits for different purposes. The format is simple and allows for further improvements in servo control which may be later implemented without requiring drastic hardware or software modifications to existing control systems, or, importantly, a new disk format.

While there have been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed is:

1. An optical information storage medium having a center comprising a uniformly distributed, angularly offset and radially offset array of optically detectable indicia, each indicium containing timing, tracking and address information which is readable by determining said angular offset and said radial offset relative to the center.

2. An optical information storage medium comprising a disk carrying detectable marks, said marks being arranged in defined regions including servo channels defined by circumferentially parsing the optical information storage medium into a plurality of uniform angular divisions and radial annular bands radially dividing the optical information storage medium into concentric rings with the servo channels and the annular bands mapped on a polar coordinate grid, and being located in each band for each servo channel to establish timing, and being angularly offset within the corresponding channel to selectively indicate an integer value to establish a band address digit and each mark being radially positioned in a selected pattern relative to other marks to identify subdivisions within each corresponding band.

3. The optical medium of claim 2 wherein one such mark is provided for each servo channel in each band.

4. The optical medium of claim 2 wherein the servo channel has a defined angular length L and the mark is angularly offset to have a defined value with respect to its corresponding position relative to a reference along said length L.

5. The optical medium of claim 4 wherein the length L is divided into V+1 equal parts and the mark has a value defined by its position at $L/(V+1)$, $2L/(V+1)$, . . . , and $VL/(V+1)$.

6. The optical medium of claim 4 wherein the length L is divided in thirds and the mark has a value defined by its position at $L/3$ and $2L/3$.

7. The optical medium of claim 6 wherein a zero is located at $L/3$ and a one is located at $2L/3$.

8. The optical medium of claim 2 wherein a mark is selectively arranged in each servo channel as a digital one or digital zero and a plurality of such ones and zeros defines the band address.

9. The optical medium of claim 8 wherein the band address has 15 mark bits defined by one mark for each bit.

10. The optical medium of claim 2 wherein a mark is arranged in each servo channel at a selected radial position, a selected plurality of marks defining different radial positions within the band establishing subdivisions of the band.

11. The optical medium of claim 2 wherein the marks are pits and are optically sensible by a laser scanner.

12. The optical medium of claim 2 wherein the marks are arranged in adjacent and alternating sets.

13. The optical medium of claim 2 wherein the marks are arranged in concentric sets.

14. An optical medium of claim 2 wherein the number of digits in a band number and the number of fields in a sector have no common prime factors.

15. An optical storage medium having a number of concentric tracks defining a data density for the optical storage medium, said optical storage medium comprising a plurality of optically detectable indicia where each indicium has an angular offset and a radial offset to convey address information, said address information being subdivided into course address information indicating radial position on the optical storage medium and fine address information indicating an exact radial and angular position on the optical storage medium, said fine address information being decodable by reading two or more optically detectable indicia without regard to said number of concentric tracks; whereby the data density of the optical storage medium can be changed without requiring a change in the plurality of optically detectable indicia to address the concentric tracks of the changed data density.

16. The optical medium of claim 15 wherein the data density is an integral multiple of a width of a single concentric track.

17. The optical medium of claim 15 wherein the data density is a ratio of small integers multiplied by a width of a single concentric track.

18. The optical medium of claim 15 wherein each concentric track contains every digit of the band number encoded within the plurality of optically detectable indicia that are centered on that track.

19. The optical medium of claim 18 wherein every digit of the band number is encoded multiple times on each concentric track thereby forming an inherent redundancy within each concentric track as long as a format of the concentric track satisfies a condition that a number of digits per band number and a product of a number of fields per sector and a number of servo channels per field have no prime factor in common.

20. An optical storage medium having a center comprising
- a plurality of optically detectable indicia, each indicium having an angular offset and a radial offset to convey timing, tracking and address information;
- a plurality of sectors which are uniform annular divisions of the optical storage medium, the sectors then being uniformly divided into a plurality of fields and the plurality of fields being further divided into a plurality of channels where at least one of said plurality of channels per field is assigned to servo functions and is designated a servo channel while a remaining of the plurality of channels are assigned to data storage; and
- a plurality of concentric bands emanating radially from the center of the optical storage medium so as to uniformly radially divide the plurality of sectors such that each servo channel has only one of said plurality of optically detectable indicia in each band.

21. The optical medium of claim 20 wherein the plurality of optically detectable indicia are arranged so that there is a known radial relationship with respect to each other indicium pit whereby fine tracking can be established.

22. The optical medium of claim 20 wherein each of the plurality of optically detectable indicia has an angular position within its corresponding servo channel which establishes a value and each servo channel has V angularly offset locations therein to define the value in a range from zero to V−1, said value then being usable to establish an address for each band.

23. The optical medium of claim 20 wherein the plurality of optically detectable indicia are adapted to convey timing information by determining angular separation between two or more of the optically detectable indicia.

24. The optical medium of claim 20 wherein the address information in the plurality of optically detectable indicia is decodable by determining the angular position of each optically detectable indicium within the servo channel and radial position of each optically detectable indicia relative to the other indicia.

25. An optical storage medium for use in combination with an optical servo where the optical servo is subject to radial run-out while reading information from the optical storage medium, said optical storage medium comprising a plurality of optically detectable indicia, each indicium having an angular offset and a radial offset to convey tracking and address information and each of said indicia being independently decodable to generate a course address to determine a radial position of the optical servo relative to the optical storage medium.

26. The optical medium of claim 25 wherein the optical servo has a '0' and a '1' window signal which is a periodic clock signal for determining whether each of the plurality of indicia represent numerical zeroes or ones and the coarse address of an optically detectable indicium is roughly determinable by resolving a zero crossover relative to said the '0' and the '1' window signal such that if the zero crossover occurs midway of the '0' window signal then the optically detectable indicium is a numerical zero; if the zero crossover occurs midway of the '1' window signal, then the optically detectable indicium is a numerical one.

27. The optical medium of claim 26 wherein the numerical zeroes and ones are band address digits and band address digits of equivalent significance align radially from band to band such that coarse addresses can be read even if tracking has not been established.

28. The optical medium of claim 25 wherein two or more of the plurality of optically detectable indicia are decodable to generate a progressively finer address as the plurality of optically detectable indicia are read from a most significant bit to a least significant bit.

29. A method for determining address information on an optical storage medium having a plurality of optically detectable indicia, said method comprising
- determining a coarse address for each optically detectable indicium by reading an angular offset of the optically detectable indicium indicating radial position on the optical storage medium; and
- resolving a fine address by decoding two or more of the optically detectable indicium by determining a radial position of the two or more of the optically detectable indicium on the optical storage medium.

* * * * *